US010625174B2

(12) United States Patent
Ito

(10) Patent No.: US 10,625,174 B2
(45) Date of Patent: Apr. 21, 2020

(54) FRESH-WATER GENERATING APPARATUS

(71) Applicants: ONEWORLD CORPORATION, Osaka (JP); Tomoaki Ito, Osaka (JP)

(72) Inventor: Tomoaki Ito, Osaka (JP)

(73) Assignee: ONEWORLD CORPORATION (JP)

( * ) Notice: Subject to any disclaimer, the term of this patent is extended or adjusted under 35 U.S.C. 154(b) by 0 days.

(21) Appl. No.: 15/556,346

(22) PCT Filed: Mar. 10, 2016

(86) PCT No.: PCT/JP2016/057553
§ 371 (c)(1),
(2) Date: Sep. 7, 2017

(87) PCT Pub. No.: WO2016/143848
PCT Pub. Date: Sep. 15, 2016

(65) Prior Publication Data
US 2018/0043277 A1    Feb. 15, 2018

(30) Foreign Application Priority Data

Mar. 10, 2015 (JP) ................................. 2015-047132

(51) Int. Cl.
*B01D 1/14* (2006.01)
*B01D 5/00* (2006.01)
(Continued)

(52) U.S. Cl.
CPC ................ *B01D 1/14* (2013.01); *B01D 1/00* (2013.01); *B01D 5/006* (2013.01); *B01D 5/0027* (2013.01);
(Continued)

(58) Field of Classification Search
CPC ... C02F 1/04–18; F24F 3/1411; F24F 3/1423; F24F 3/1429; B01D 1/00–305
(Continued)

(56) References Cited

U.S. PATENT DOCUMENTS 1,082,411 A * 12/1913 Cozzolino ................ B01D 1/22
159/13.3
2,445,350 A * 7/1948 Ginnings ............. B01D 61/364
202/172
(Continued)

FOREIGN PATENT DOCUMENTS

GB     2330779 A     5/1999
GB     2400603 A    10/2004
(Continued)

OTHER PUBLICATIONS

Sigma-Aldrich, "Al-143 Mineral Adsorbents, Filter Agents and Drying Agents", Feb. 11, 2011 (Date obtained from WaybackMachine). (Year: 2011).*
(Continued)

*Primary Examiner* — Jonathan Luke Pilcher
(74) *Attorney, Agent, or Firm* — Jordan and Koda, PLLC

(57) ABSTRACT

To provide a fresh water-generating apparatus that does not require large amounts of heating energy as in the past, also does not require maintenance such as replacement of reverse osmosis membranes, and is simpler and inexpensive.
[Solution] A fresh water-generating apparatus is configured from: a first porous water-absorbing substrate 3, each hole diameter of the porous structure that is immersed in a stored liquid 4 stored in a first storage tank 1 being formed in the size of a water molecule; a blower 6 for blowing air on the upper end of the first porous water-absorbing substrate 3; a second porous water-absorbing substrate 7 for catching water vapor, which is vaporized from the upper end of the first porous water-absorbing substrate 3 by the air flow from the blower 6 and is blown out, on the front surface thereof; a storage tank 2 for storing water that condenses inside the second porous water-absorbing substrate 7 and drips from the lower part of the second porous water-absorbing substrate 7; and a guide pipe 8 for connecting air that is sent out
(Continued)

and discharged from the second porous water-absorbing substrate 7 to the air intake side of the blower 6.

2 Claims, 3 Drawing Sheets

(51) Int. Cl.
*C02F 1/04* (2006.01)
*B01D 1/00* (2006.01)
*B01D 15/00* (2006.01)
*C02F 1/28* (2006.01)
*C02F 103/08* (2006.01)

(52) U.S. Cl.
CPC ............ *B01D 5/0039* (2013.01); *B01D 15/00* (2013.01); *C02F 1/04* (2013.01); *C02F 1/048* (2013.01); *C02F 1/281* (2013.01); *C02F 2103/08* (2013.01)

(58) Field of Classification Search
USPC .................................................. 159/16.1, 906
See application file for complete search history.

(56) References Cited

U.S. PATENT DOCUMENTS

| | | | | |
|---|---|---|---|---|
| 3,236,768 | A * | 2/1966 | Litt | .......................... C02F 1/001 |
| | | | | 159/1.1 |
| 3,266,630 | A | 8/1966 | Litt | |
| 3,878,054 | A * | 4/1975 | Rodgers | ................... B01D 1/10 |
| | | | | 203/11 |
| 5,203,161 | A * | 4/1993 | Lehto | ................... B01D 53/263 |
| | | | | 60/39.53 |
| 6,716,320 | B1 * | 4/2004 | Cole | ....................... B01D 3/346 |
| | | | | 159/16.1 |
| 8,496,234 | B1 * | 7/2013 | Govindan | ............ B01D 1/0058 |
| | | | | 261/128 |
| 9,440,862 | B1 * | 9/2016 | Rahman | ..................... C02F 1/14 |
| 9,770,672 | B2 * | 9/2017 | Peever | ....................... F26B 5/16 |
| 2007/0272627 | A1 | 11/2007 | Giangrasso | |
| 2008/0066874 | A1 | 3/2008 | Bhatti et al. | |

FOREIGN PATENT DOCUMENTS

| | | | |
|---|---|---|---|
| JP | 47-038673 | A | 12/1972 |
| JP | 57-147096 | A | 9/1982 |
| JP | 62-030501 | A | 2/1987 |
| JP | H02191586 | A | 7/1990 |
| JP | 03-89990 | A | 4/1991 |
| JP | 10-071320 | A | 3/1998 |
| JP | 2009119435 | A | 6/2009 |
| JP | 2011031157 | A | 2/2011 |
| JP | 2011245478 | A * | 12/2011 |
| JP | 2012040454 | A | 3/2012 |
| WO | 2004067451 | A1 | 8/2004 |

OTHER PUBLICATIONS

R. K. Joshi, P. Carbone, F. C. Wang, V. G. Kravets, Y. Su, I. V. Grigorieva, H. A. Wu, A. K. Geim, R. R. Nair, "Precise and Ultrafast Molecular Sieving Through Graphene Oxide Membranes", Science Feb. 14, 2014: vol. 343, Issue 6172, pp. 752-754, DOI: 10.1126/science.1245711 (Year: 2014).*

Shah, Ramesh K. "Extended Surface Heat Transfer", Thermopedia, Feb. 14, 2011, Available online at: http://www.thermopedia.com/content/750/ (Year: 2011).*

IP.com translation of JP 2011245478 A (Year: 2011).*

* cited by examiner

FRESH-WATER GENERATING APPARATUS

BACKGROUND OF THE INVENTION

The present invention relates to a fresh-water generating apparatus for purifying, inter alia, seawater, sludge water, oily water, and industrial waste water.

In the past, systems of heating and evaporating seawater and then cooling the water to obtain fresh water have been common as methods for purifying, inter alia, seawater, and multi-stage flushing systems have been used in which the water is distilled under reduced pressure in order to improve heating efficiency, and a large number of depressurizing chambers are combined in a practical plant (Patent Document 1). The salt concentration of the generated fresh water is low at approximately less than 5 ppm, and fresh water can be generated in large quantities.

In recent years, a system has been employed in which seawater is passed under pressure through a type of filtering membrane known as a reverse-osmosis membrane (a so-called RO membrane), and the salt in the seawater is condensed and removed to strain out freshwater, for which a large plant is constructed that exceeds 10,000 tons per day. An RO membrane requires higher pressure for filtration with higher salt concentrations in the seawater or with lower desired salt concentrations in the freshwater, and various membranes of complicated structures, known as hollow fiber membranes and spiral membranes, have been proposed to withstand this pressure (Patent Document 2). A turbine pump, a plunger pump, or another high-pressure pump is used to increase pressure.

PRIOR ART DOCUMENTS

Patent Documents

[Patent Document 1] Japanese Laid-open Patent Publication No. 10-71320
[Patent Document 2] Japanese Patent No. 4113568

SUMMARY OF THE INVENTION

However, with the multi-stage flushing system described above, although large quantities of fresh water can be generated, the quality of the seawater is not inspected, and a problem with this system has been that heating efficiency is very poor and large amounts of energy are required. A problem with a system that uses an RO membrane has been that because a pump is used to increase pressure, the amount of fresh water generated is only about 5% from seawater and only about 10% from sludge water or oily water. Moreover, because the RO membrane can become clogged, either periodic maintenance must be performed to undo the clogging by reverse pressurization, or the RO membrane itself must be replaced as appropriate. Another problem with these prior-art systems has been that including maintenance costs, it is costly to construct and operate a fresh water-generating plant, and high costs are inevitable even considering cost against fresh water-generating efficiency.

In view of this, the applicant's purpose is to provide a fresh-water generating apparatus that does not require large amounts of heating energy as in the past, that can generate fresh water at room temperature, and that, which a simpler configuration, does not incur high installation costs including maintenance expenses.

Means for Solving the Aforementioned Problems

To solve the problems described above, the present invention is configured as follows. Specifically, a fresh-water generating apparatus according to a first aspect of the present invention is characterized by comprising: a first storage tank in which seawater, sludge water, oily water, industrial waste water, or another stored liquid is accommodated; a first water-absorbing base material of which a lower end is impregnated with the stored liquid of the first storage tank; a blowing means for blowing air at an upper-end side of the first water-absorbing base material; a second water-absorbing base material for causing water vapor vaporized and blown out from the upper-end side of the first water-absorbing base material by the air blown by the blowing means to adsorb and condense on the upper-end side, the second water-absorbing base material being designed so that the condensed water droplets drip down from a lower-end side; a second storage tank in which the condensed water dripping down from the second water-absorbing base material is stored; a lid for closing an upper space of the first and second storage tanks; and a guide pipe of which one end communicates with the upper space of the second storage tank of the lid to exhaust the air blown from the blowing means, and the other end communicates with the upper space of the first storage tank and with an intake side of the blowing means to form a circulation path for the blown air.

In a fresh-water generating apparatus according to a second aspect, the first and second water-absorbing base materials are configured from synthetic zeolite of which each hole diameter of a porous structure is formed to the size of a water molecule.

In a fresh-water generating apparatus according to a third aspect, the first and second water-absorbing base materials are configured from nanocarbon of which each hole diameter of a porous structure is formed to the size of a water molecule.

In a fresh-water generating apparatus according to a fourth aspect, the first and second water-absorbing base materials are configured from a fabric having excellent water absorbency.

In a fresh-water generating apparatus according to a fifth aspect, the first and second water-absorbing base materials are connected at an upper adjacent surface on which the base materials are disposed, and are formed integrally in the shape of an upside-down letter U.

A fresh-water generating apparatus according to a sixth aspect is configured such that an air cooler is installed, compressed air being supplied to the air cooler, and cold air jetted from the air cooler is supplied to the second storage tank while hot air exhausted from the air cooler is supplied to the intake side of the blowing means.

A fresh-water generating apparatus according to a seventh aspect is configured such that the stored liquid is stored in the first storage tank with the level of the liquid lowered as much as possible.

A fresh-water generating apparatus according to an eighth aspect is configured such that suspended inside the second storage tank are a plurality of metal fin-like members for causing water vapor accumulating in the second storage tank to condense.

Effect of the Invention

With the fresh-water generating apparatus according to the present invention, the lower end of the first water-absorbing base material is immersed in, inter alia, seawater stored in the first storage tank, and the interior of this water-absorbing base material is impregnated only with moisture from the, inter alia, seawater stored in the first storage tank. The moisture impregnating the first water-absorbing base material is sequentially vaporized and blown out as water vapor by the air blown by the blowing means.

When the vaporized water vapor is blown out along with the blown air from the first water-absorbing base material, this water vapor reaches the second water-absorbing base material where it is adsorbed within the second water-absorbing base material, the water vapor then sequentially releases heat and condenses while continuing to impregnate the base material, and the vapor becomes fresh water droplets which drip down from the lower-end side of the base material into the second storage tank. When the blown air itself continues to pass through the second water-absorbing base material, the temperature rises due to the water vapor condensation, the air is dried and exhausted through the guide pipe, and the air is refluxed to the intake side of the blowing means.

The air refluxed to the intake side of the blowing means is blown to the first water-absorbing base material as dry air higher in temperature than before going through this circulation cycle; therefore, the water impregnating the substrate is caused to vaporize more than the previous time, and the condensed fresh water is caused to be stored in the second storage tank.

Thus, only moisture is vaporized from, inter alia, the seawater stored in the first storage tank between the first and second water-absorbing base materials, the vaporized water vapor condenses, and fresh water is continually stored in the second storage tank, whereby fresh water generation can be carried out at room temperature.

The apparatus configuration can be easily achieved by using, as the water-absorbing base materials, synthetic zeolite or nanocarbon developed by the applicant and having each hole diameter of a porous structure formed to the size of a water molecule, and a fabric having excellent water absorbency can be substituted in order to achieve an even simpler configuration. A yet even simpler configuration can be achieved if the first and second water-absorbing base materials are connected at an upper adjacent surface on which the base materials are disposed, and are formed integrally in the shape of an upside-down letter U.

If the configuration is such that a so-called ultra-low temperature air generator, which is an air cooler, is installed, compressed air being supplied to the air cooler, and cold air jetted from the air cooler is supplied to the second storage tank while hot air exhausted from the air cooler is supplied to the intake side of the blowing means, then air refluxing to the intake side of the blowing means is blown as warm air of an even higher temperature to the first porous water-absorbing base material, vaporization is further facilitated, ultra-low temperature air is supplied into the second storage tank, the temperature of the second water-absorbing base material decreases, further facilitating water vapor condensation, and the efficiency of fresh water generation can be increased.

Additionally, the efficiency of heat transfer to the stored liquid itself is ensured to not decrease by appropriately replenishing the stored liquid so that the stored liquid is stored in the first storage tank with the level of the liquid lowered as much as possible, and if a plurality of metal fin-like members are suspended within the second storage tank, the water vapor is condensed on the fin-like members as well when the water vapor accumulating within the second storage tank is cooled by the cold air; therefore, the efficiency of fresh water generation can be further increased.

DESCRIPTION OF THE PREFERRED EMBODIMENTS

An embodiment of the present invention is described below with reference to the drawings.

Figure 1:
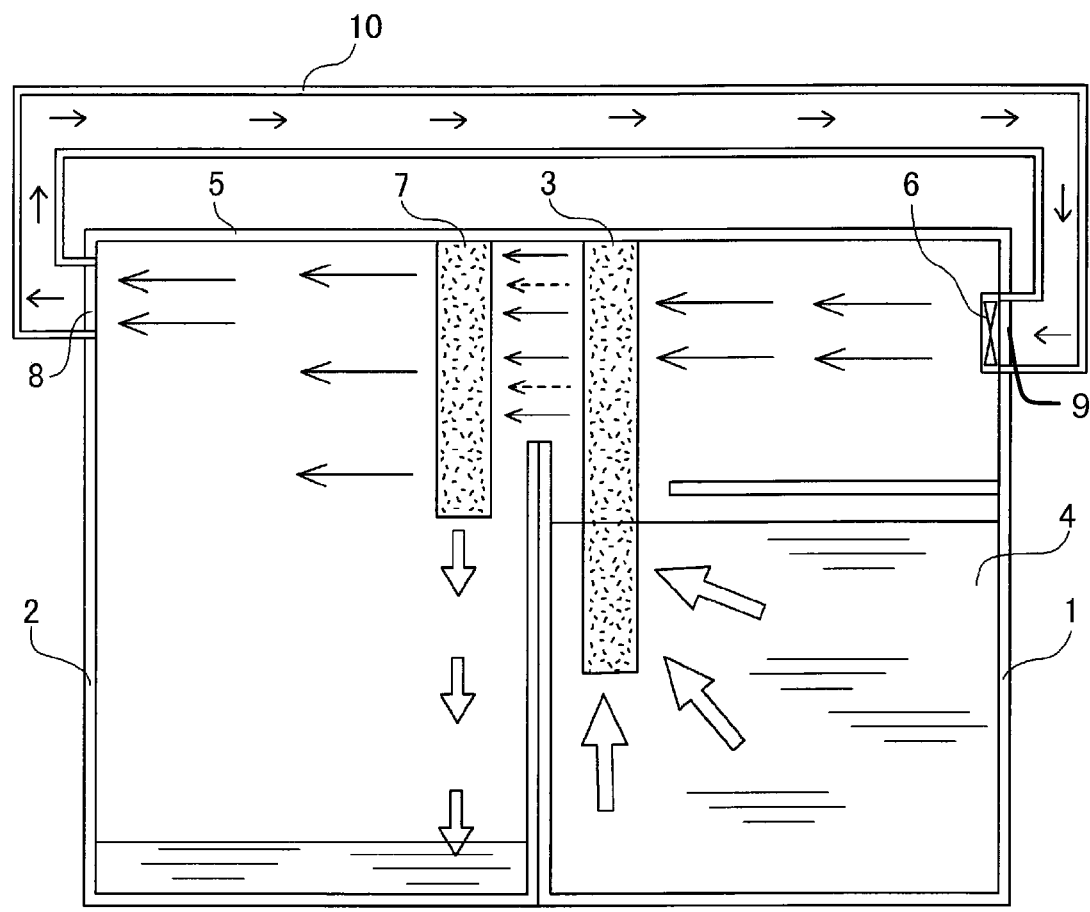
FIG. 1 is a schematic configuration diagram showing the overall configuration of a fresh-water generating apparatus.

FIG. 1 is a schematic configuration diagram showing the overall configuration of a fresh-water generating apparatus. In this diagram, a first storage tank 1, in which seawater, sludge water, oily water, or another stored liquid 4 is stored, and a second storage tank 2, adjacent to the storage tank 1, are set up next to each other. In the bordering side of the storage tank 1 that is adjacent to the storage tank 2, a first porous water-absorbing substrate 3, which serves as a water-absorbing base material of which each hole diameter of the porous structure is formed to the size of a water molecule, is suspended from a lid 5 provided so as to close off an upper space of the storage tank 1 and the storage tank 2, and the lower end portion thereof is immersed in the stored liquid 4 stored in the storage tank 1. A blower 6 for blowing air at the upper side of the first porous water-absorbing substrate 3 not immersed in the stored liquid 4 is installed on the inner front wall surface of the lid 5.

In the bordering side of the storage tank 2 that is adjacent to the storage tank 1, a second porous water-absorbing substrate 7, which serves as a water-absorbing base material of which each hole diameter of the porous structure is formed to the size of a water molecule, is suspended from the lid 5 in a position of facing the first porous water-absorbing substrate 3, so that the lower end of the second porous water-absorbing substrate 7 leads into the storage tank 2. An exhaust port 8 is formed in the inner rear wall surface of the lid 5 closing the second storage tank 2 side, and a guide pipe 10 is provided to the exhaust port 8, the guide pipe 10 passing above the lid 5 and communicating with an intake port 9 provided to the aforementioned blower 6 side.

The aforementioned first and second porous water-absorbing substrates 3, 7 are made from synthetic zeolite of which each hole diameter of the porous structure is formed to the same diameter as a water molecule, by baking for a long period of time under strict temperature control using a specially constructed baking furnace, developed by the applicant and capable of heating to single-degree accuracy in a high-temperature range of 800 to 2000° C. When immersed in the stored liquid, the substrates function so as to be able to instantly adsorb only water molecules in the porous portions, and when the substrates have adsorbed water vapor, the substrates can exhibit the function of condensing the water vapor and extracting the vapor as distilled water. A nanocarbon material or a fabric or the like woven to water molecule diameters can also be used as water-absorbing base materials exhibiting the same functions.

The fresh water-generating function of the fresh-water generating apparatus configured as above shall be described. Because the lower end of the first porous water-absorbing substrate 3 is immersed in the stored liquid 4 stored in the storage tank 1, only the moisture in the stored liquid 4 instantly impregnates entirely through the porous water-absorbing substrate 3. The blower 6 continues to blow air (shown by the arrows in the diagram) at the front-surface side of the first porous water-absorbing substrate 3, and the moisture continually impregnating the substrate 3 is therefore sequentially vaporized and blown out as water vapor (shown by the dashed-line arrows in the diagram) from the reverse-surface side of the substrate 3.

The water vapor thus blown out reaches the front surface of the second porous water-absorbing substrate 7 suspended on the second storage tank 2 side, impregnates the second porous water-absorbing substrate 7, sequentially releases heat and condenses while impregnating the substrate, and becomes fresh water droplets (shown by the white empty arrows in the diagram) which drip down from the lower-end-side of the substrate 7; thus, fresh water is stored in the storage tank 2.

The blown air itself, exhausted from the exhaust port 8 provided to the rear inner wall surface of the lid 5 closing the storage tank 2, is blown through the guide pipe 10 out to the intake port 9 provided to the aforementioned blower 6, and the air thus refluxes. The blown air itself at this time rises in temperature due to the heat released by the condensation of the water vapor, and becomes drier air.

Air that has refluxed to the intake port 9 side of the blower 6 is blown to the first porous water-absorbing substrate 3 as dry air higher in temperature than before going through this circulation cycle; therefore, the water impregnating the substrate 3 is caused to vaporize more than the previous time, only moisture continues to be efficiently absorbed from the stored liquid 4 in the storage tank 1, the vaporized water vapor is adsorbed on the second porous water-absorbing substrate 7, and the water condenses and continues to drop in greater amounts into the storage tank 2. If the amount of the stored liquid 4 decreases, the liquid is replenished into the storage tank 1 from a supply channel (not shown), and the liquid is taken out through an inlet channel (not shown) when the fresh water stored in the storage tank 2 increases.

When only moisture is extracted from the stored liquid 4 in the storage tank 1 due to this fresh water-generating process, salt or the like remains as residue in the storage tank 1 in the case of seawater, of sludge in the case of sludge water and various oils in the case of oily water, and these residues are recovered and disposed by post-treatment so as not to incur a load on the environment.

The fresh-water generating apparatus according to the present invention, as described above, has a very simple apparatus configuration which draws up only moisture from a stored liquid 4 in a storage tank 1 between first and second porous water-absorbing substrates, vaporizes the moisture by blowing air, causes the vaporized water vapor to adsorb and condense, and stores the vapor in a storage tank 2, by using porous water-absorbing substrates capable of instantly adsorbing moisture, the substrates being made of synthetic zeolite baked from a special component blend developed by the applicant and having each hole diameter of a porous structure formed to the same diameter as a water molecule. The fresh-water generating apparatus according to the present invention can thereby efficiently generate fresh water at room temperature without requiring large amounts of heating energy and with no need to replace the substrates themselves. The amount of fresh water generated can be controlled merely by adjusting the amount of air blown in a blowing means, and a basic apparatus configuration for an ordinary storage tank can therefore be actualized in a very simple manner and at low cost.

Figure 2:
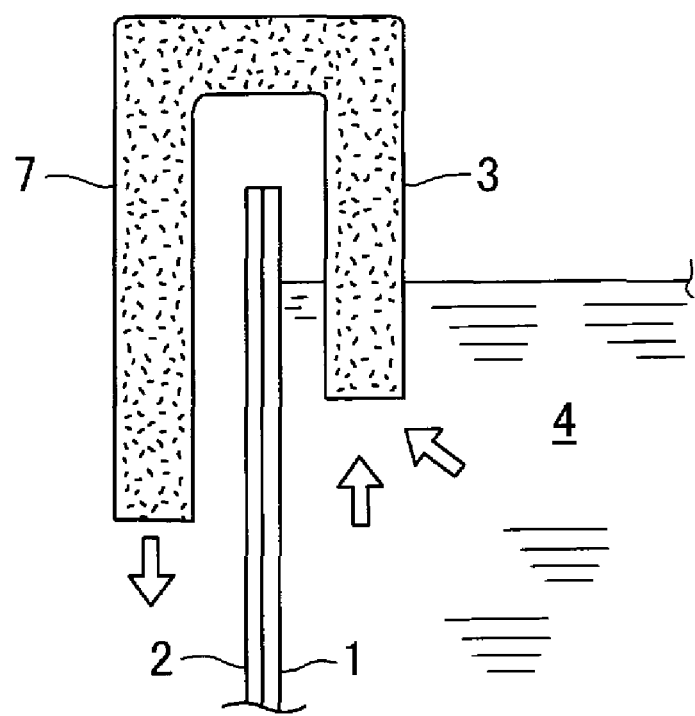
FIG. 2 is a schematic configuration diagram showing an example in which first and second water-absorbing base materials are formed as being integrated together.

In the above example, the apparatus can have a simpler configuration if the first and second porous water-absorbing substrates 3, 7 are connected at an upper adjacent surface and formed integrally in the shape of an upside-down letter U, as shown in FIG. 2. In this case, the lower end of the first porous water-absorbing substrate 3 should be formed shorter than the lower end of the second porous water-absorbing substrate 7, in consideration for tube capillarity.

Figure 3:
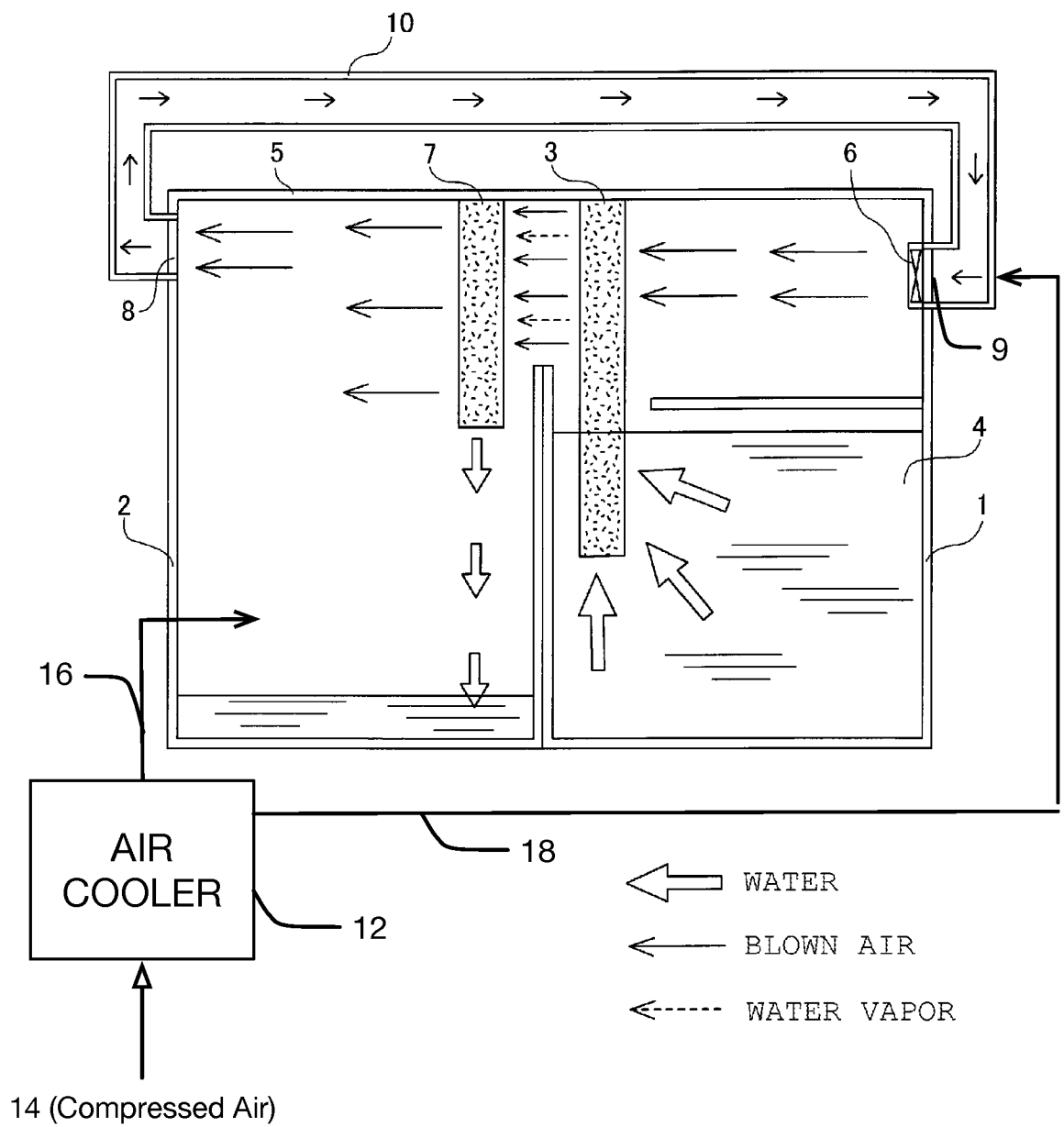
FIG. 3 is a schematic configuration diagram showing the overall configuration of another embodiment of a fresh-water generating apparatus.

FIG. 3 shows a configuration of the apparatus of FIG. 1, in which a so-called ultra-low temperature air generator, which is an air cooler 12, is installed, compressed air 14 being supplied to the air cooler, and cold air 16 jetted from the air cooler is supplied to the storage tank 2 while hot air 18 exhausted from the air cooler is supplied to the intake 9 side of the blower 6, then air refluxing to the intake side of the blower 6 is blown as warm air of an even higher temperature to the first porous water-absorbing substrate 3, vaporization is further facilitated, ultra-low temperature air is supplied into the storage tank 2, the temperature of the second porous water-absorbing substrate 7 decreases, further facilitating water vapor condensation, and the efficiency of fresh water generation can be increased.

Furthermore, the efficiency of heat transfer to the stored liquid 4 itself is ensured to not decrease by appropriately replenishing the stored liquid so that the stored liquid 4 is stored in the storage tank 1 with the level of the liquid lowered as much as possible, and if a plurality of metal fin-like members (not shown) are suspended within the second storage tank 2, the water vapor accumulating in the storage tank 2 is also condensed on the fin-like members when the interior of the storage tank 2 is cooled by the cold air; therefore, the efficiency of fresh water generation can be further increased.

As described above, drinkable water can be obtained if heating and ozone treatment are carried out on, and minerals added to, fresh water generated from seawater. Even with contaminated water contaminated with arsenic or the like, the contaminant can be removed to obtain drinkable water. Furthermore, with industrial waste water as well, with which biochemical oxygen demand and chemical oxygen demand are problems, if waste water treatment is performed using the present apparatus, problem-free waste water can be achieved, and waste water treatment can be performed on dyes and other dye water made similarly transparent.

REFERENCE SIGNS LIST

1 First storage tank
2 Second storage tank
3 First porous water-absorbing substrate
4 Stored liquid
5 Lid
6 Blower
7 Second porous water-absorbing substrate
8 Exhaust port
9 Intake port
10 Guide pipe

The invention claimed is:
1. A fresh-water generating apparatus, comprising:
a first storage tank in which stored liquid, comprising water and another substance, is accommodated, the first storage tank being open at a top end;
a second storage tank in which fresh water obtained from the stored liquid is stored, the second storage tank being open at a top end and being located adjacent the first storage tank;
a lid common to the first storage tank and the second storage tank, and comprising a cover portion located at the open end of the first storage tank and the open end of the second store tank to close off the open top end of the first store tank and the open top end of the second storage tank;

an intake port in communication with an upper portion of the first storage tank;

an exhaust port in communication with an upper portion of the second storage tank;

a guide pipe distinct from the lid, the guide pipe having a first end coupled to the exhaust port so as to receive exhaust air from the second storage tank, the guide pipe having a second end coupled to the inlet port of the lid so as to provide air to the first storage tank;

a first water-absorbing base material contained within the first storage tank suspended from the cover portion of the lid, wherein a lower end of the first water absorbing base material is impregnated with the stored liquid of the first storage tank;

a second water-absorbing base material contained within the second storage tank suspended from the cover portion of the lid; and a blowing means for blowing air at an upper-end side of the first water-absorbing base material and for forming an air circulation path through the upper portion of the first storage tank, the upper portion of the second storage tank, and the guide pipe; and wherein water absorbed from the first storage tank is released from the upper-end side of the first water-absorbing base material as water vapor blown by the blowing means; and wherein the second water-absorbing base material is positioned in the circulation path and receives the water vapor blown from the upper-end side of the first water absorbing base material, the received water vapor condensing on an upper-end side of the second water absorbing base material into water droplets while also impregnating the second water-absorbing base material, the water vapor giving off heat while condensing, the water droplets dripping down into the second storage tank from a lower-end side of the second water-absorbing base material.

2. The fresh-water generating apparatus according to claim 1, wherein either one or both of the first and second water-absorbing base materials comprise synthetic zeolite, wherein the synthetic zeolite comprises a porous structure having pores with diameters formed to the size of a water molecule.

* * * * *